(12) United States Patent
Lee et al.

(10) Patent No.: US 7,244,101 B2
(45) Date of Patent: Jul. 17, 2007

(54) DUST RESISTANT PLATFORM BLADE

(75) Inventors: Ching-Pang Lee, Cincinnati, OH (US); Darek Tomasz Zatorski, Florence, KY (US); Brian Alan Norton, Cincinnati, OH (US); Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 11/243,378

(22) Filed: Oct. 4, 2005

(65) Prior Publication Data

US 2007/0077144 A1    Apr. 5, 2007

(51) Int. Cl.
F01D 5/18    (2006.01)

(52) U.S. Cl. .................... 416/97 R; 416/90 R; 416/248

(58) Field of Classification Search ............ 416/193 A, 416/248, 97 R, 97 A, 90 R
See application file for complete search history.

(56) References Cited

U.S. PATENT DOCUMENTS

| | | |
|---|---|---|
| 4,992,025 A | 2/1991 | Stroud et al. |
| 5,382,135 A | 1/1995 | Green |
| 6,155,778 A | 12/2000 | Lee et al. |
| 6,164,913 A | 12/2000 | Reddy |
| 6,171,058 B1 | 1/2001 | Stec |
| 6,341,939 B1 * | 1/2002 | Lee ........................ 416/97 R |
| 2005/0095129 A1 * | 5/2005 | Benjamin et al. ......... 416/97 R |

OTHER PUBLICATIONS

GE Aircraft Engines, "CF6-80C2 HPT Stage 2 Blade," on sale and in public use in US more than one year before Aug. 31, 2004.
U.S. Appl. No. 11/035,866; filed Jan. 10, 2005; "Funnel Fillet Turbine Stage," by Ching-Pang Lee et al.

* cited by examiner

*Primary Examiner*—Edward K. Look
*Assistant Examiner*—Dwayne J White
(74) *Attorney, Agent, or Firm*—William S. Andes; Francis L. Conte

(57) ABSTRACT

A gas turbine engine rotor blade includes an airfoil, platform, shank, and dovetail integrally joined together. A dust escape hole extends through the platform adjacent a fillet bridging the platform and shank to bleed dust therefrom during operation.

29 Claims, 7 Drawing Sheets

DUST RESISTANT PLATFORM BLADE

BACKGROUND OF THE INVENTION

The present invention relates generally to gas turbine engines, and, more specifically, to turbine rotor blades therein.

In a gas turbine engine, air is pressurized in a compressor and mixed with fuel in a combustor for generating hot combustion gases. Energy is extracted from the gases in various turbine stages in a high pressure turbine (HPT) and a low pressure turbine (LPT).

The HPT includes one or more stages of rotor blades extending from a supporting rotor disk which drive the corresponding rotor blades of the compressor. And, the LPT typically includes several rotor stages of blades extending from corresponding disks which drive an upstream fan in an aircraft engine application, or drive an external drive shaft for marine and industrial applications.

An aircraft engine is used to power an aircraft in flight in various locations around the world. The engine is therefore subject to ingestion of dust and other pollutants along with the intake air. Dust is a generic term for the various particulates or foreign body contamination found in the ambient air through which the aircraft flies, and which may be harmful to the longevity of the engine.

For example, the ambient air may be polluted from automotive vehicles and industrial plants typically concentrated around major cities, which also typically have regional airports. Airports in cold regions typically use chemical deicers in the winter months for de-icing aircraft prior to flight. And, the eruption of volcanoes additionally discharges substantial contamination into the atmosphere.

Accordingly, the atmosphere found around the world contains various pollutants which can adversely affect the life of a gas turbine engine. The terms dust is used herein as a generic term for the various forms of foreign body matter which may be found in the air that may adversely affect engine life. Typical dust is in the form of fine particles of foreign matter like sulfur, sodium, potassium, and magnesium for typical examples found in various aircraft routes around the world.

Dust can be a problem in gas turbine engines because it is ingested with the ambient air and is subject to the hot combustion process, as well as remains in the air bled from the compressor in typical use for cooling hot engine components.

The HPT is subject to the hottest combustion gases and is therefore configured with various cooling circuits that circulate pressurized cooling air from the compressor. The cooling circuits include small channels and typical film cooling holes through which the pressurized air must pass.

Since the film cooling holes are relatively small, plugging thereof by dust during operation would severely shorten the useful life of the component. In a typical turbine rotor blade, for example, the tip thereof may include relatively large dust escape holes to provide a convenient location for the discharge of undesirable dust and minimize its accumulation inside the hollow blade.

However, recent experience in use of an exemplary gas turbine engine enjoying years of successful commercial public use in this country and abroad has uncovered a new problem of dust accumulation under the platform of turbine blades.

A turbine rotor blade typically includes a hollow airfoil extending radially outwardly from a platform which defines the radially inner flowpath boundary. The platform in turn is joined to a plain shank that terminates in a dovetail for mounting the blade in a corresponding slot in the perimeter of the supporting rotor disk.

Since energy is extracted from the combustion gases as they flow downstream between the turbine blades in each stage or row, there is a corresponding pressure drop between the leading and trailing edges of the blades. Pressurized cooling air is bled from the compressor and channeled to the blades through inlets at the base of the dovetails thereof. The shank regions of the blades are typically provided with pressurized purge air to prevent the ingestion of combustion gases therein.

Accordingly, dust-laden air is not only channeled through the individual turbine rotor blades, but is also channeled outside the blades under the corresponding platforms, and is therefore subject to undesirable accumulation in any local surface discontinuity or pocket formed by the various portions of the turbine blade below the platform.

For example, the platform joins the shank at corresponding fillets which is one site for accumulation of dust. The platform also joins the shank at forward and aft angel wing seals that define additional internal corners and fillets in which dust may accumulate. And, turbine rotor blade may also include dampers which are trapped in corresponding pockets between adjacent blades, with these pockets also providing additional sites for undesirable dust accumulation.

Furthermore, the turbine blade extends radially outwardly from the rotor disk and is subject to considerable centrifugal force during operation. The centrifugal force also acts on the dust particles in the cooling air driving these particles into stagnant fillets or corners or pockets where they may accumulate.

The recent experience described above has shown that the accumulation of undesirable dust can lead to corrosion of the superalloy metal materials that form the turbine blades, which further shortens the useful life of the turbine blades in the hostile environment of the gas turbine engine.

Accordingly, it is desired to provide a turbine rotor blade with a dust proof or resistant platform for minimizing the accumulation of undesirable dust therein over the life thereof.

BRIEF DESCRIPTION OF THE INVENTION

A gas turbine engine rotor blade includes an airfoil, platform, shank, and dovetail integrally joined together. A dust escape hole extends through the platform adjacent a fillet bridging the platform and shank to bleed dust therefrom during operation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
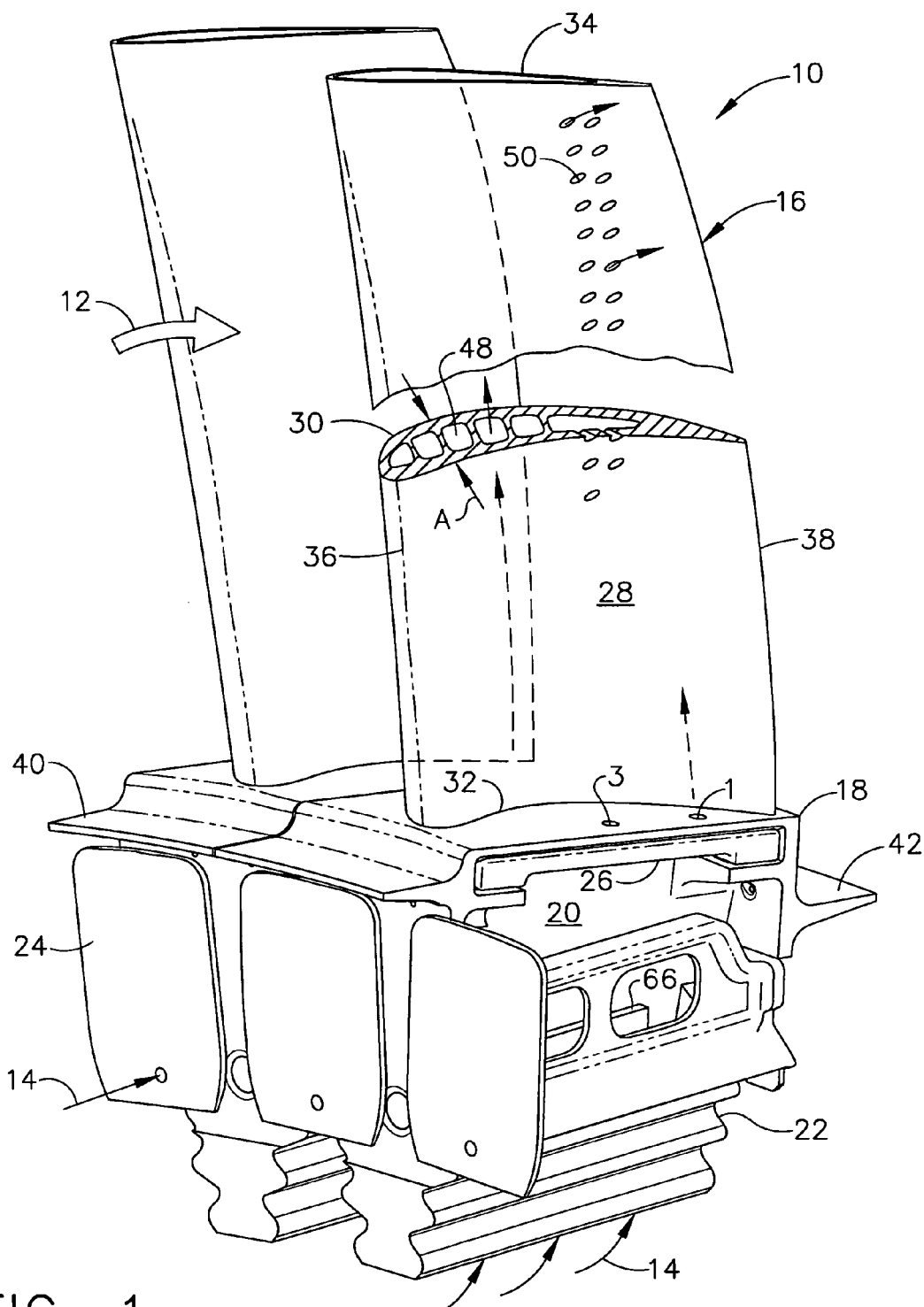
FIG. 1 is a partly sectional, elevational view of two HPT stage-two turbine rotor blades from a row thereof extending radially outwardly from a supporting turbine rotor disk (not shown).

Illustrated in FIG. 1 are two, circumferentially adjacent turbine rotor blades 10 for an aircraft gas turbine engine. The blades are used in a full row in a suitable stage of the engine, such as the second stage HPT.

During operation, hot combustion gases 12 are generated in an upstream combustor (not shown) and suitably channeled between the blades which extract energy therefrom. Pressurized cooling air 14 is bled from an upstream compressor (not shown) and suitably channeled to the row of blades for cooling thereof in any conventional manner.

Each turbine rotor blade 10 includes in turn an airfoil 16, platform 18, shank 20, and supporting dovetail 22 configured for being retained in corresponding dovetail slots in the perimeter of the supporting rotor disk (not shown). The blade is formed of a suitable superalloy metal in a single or unitary casting or component.

When assembled together in the turbine, a seal body 24 may be mounted between the shanks of adjacent blades for sealing the space therebetween. Each seal body has a conventional configuration including a flat radial plate at the forward end which engages the forward faces of the shanks, and an axially extending stem trapped between adjacent shanks.

Furthermore, an elongate damper 26 may also be disposed at the corresponding splitlines between adjacent platforms for providing frictional damping of the blades in a conventional configuration and manner.

Except as described hereinbelow, each turbine blade may have a conventional configuration and operation in the engine and includes for example a hollow airfoil which has a generally concave pressure side 28, and a circumferentially opposite, generally convex, suction side 30 having arcuate profiles configured for extracting energy from the combustion gases during operation.

The two sides of the airfoil extend longitudinally or radially in span from a root 32 at the top of the platform to a radially opposite, distal tip 34. The two sides also extend axially in chord between opposite leading and trailing edges 36,38 which extend the full radial span of the airfoil from root to tip.

The platform 18 is illustrated in FIG. 1 in an exemplary embodiment in the form of a thin arcuate plate extending circumferentially outwardly or laterally from both sides 28,30 of the airfoil and overhanging the shank and dovetail. Integrally joined to the platform is a forward angel wing seal 40 at the airfoil leading edge 36 that extends radially inwardly along the forward face of the shank.

A corresponding aft angel wing seal 42 is joined to the opposite end of the platform at the trailing edge 38 and extends radially inwardly along the aft face of the shank.

The forward and aft seals 40,42 have conventional configurations in the form of thin radial plates extending radially inwardly and laterally outwardly, with integral axially extending seal teeth or lips which cooperate with adjacent structure (not shown) for effecting rotary labyrinth seals.

The platform region of the turbine blade is illustrated in more detail in FIGS. 2-5 in isolation without the use of the seal bodies and dampers as would otherwise be found therein when assembled. The platform 18 is generally rectangular in profile and covers the shank 20, which is a generally smooth and plain, arcuate component that provides a structural transition from the axially symmetrical dovetail 22 to the arcuate airfoil 16 which has both camber between the leading and trailing edges and twist from root to tip atop the platform.

As best shown in FIGS. 2-5, the rectangular platform overhangs the arcuate shank 20 on both sides thereof and is joined to the top of the shank 20 at corresponding concave corners or fillets 44 which are exposed externally on the shank. These fillets 44 extend axially along the chord, and have a suitably large radius of curvature to provide a smooth transition between the platform and shank, and reduce stress concentration thereat under the substantial centrifugal loads generated by the turbine blade when rotated in operation at the perimeter of the supporting rotor disk.

The exemplary platform 18 illustrated in FIG. 1 slopes radially inwardly between its forward and aft ends, and adjoins adjacent platforms at the corresponding axial splitlines therebetween. The dampers 26 are disposed at the splitlines and provide damping, and some sealing of the splitline between the platforms.

The seal bodies 24 typically include a small inlet hole near the bottoms thereof through which some of the pressurized air 14 bled from the compressor is channeled during operation for purging the cavities formed between adjacent blade shanks under the corresponding portions of the overhanging platforms.

Figure 2:
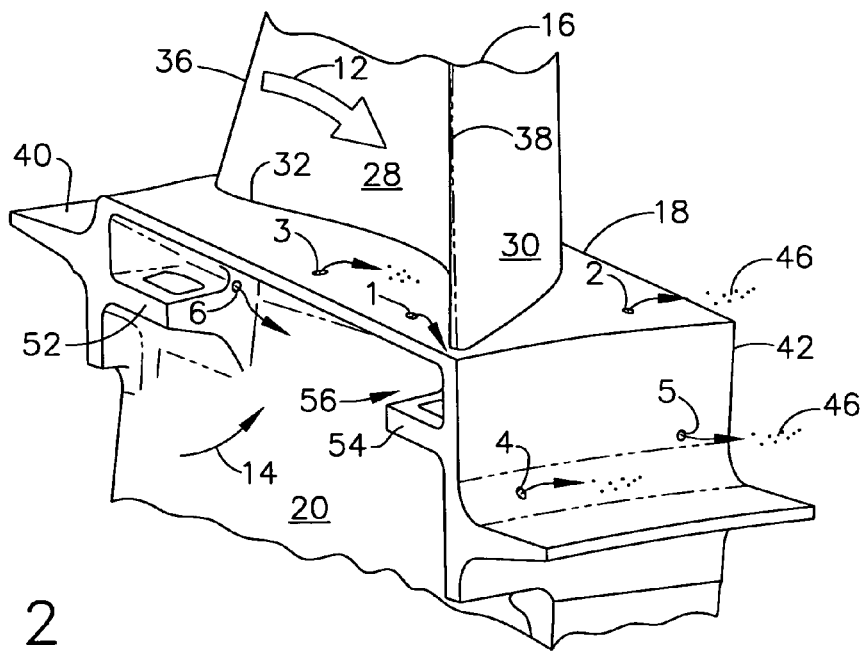
FIG. 2 is an enlarged, isometric view of the aft, pressure side of one of the platforms illustrated in FIG. 1.
Figure 3:
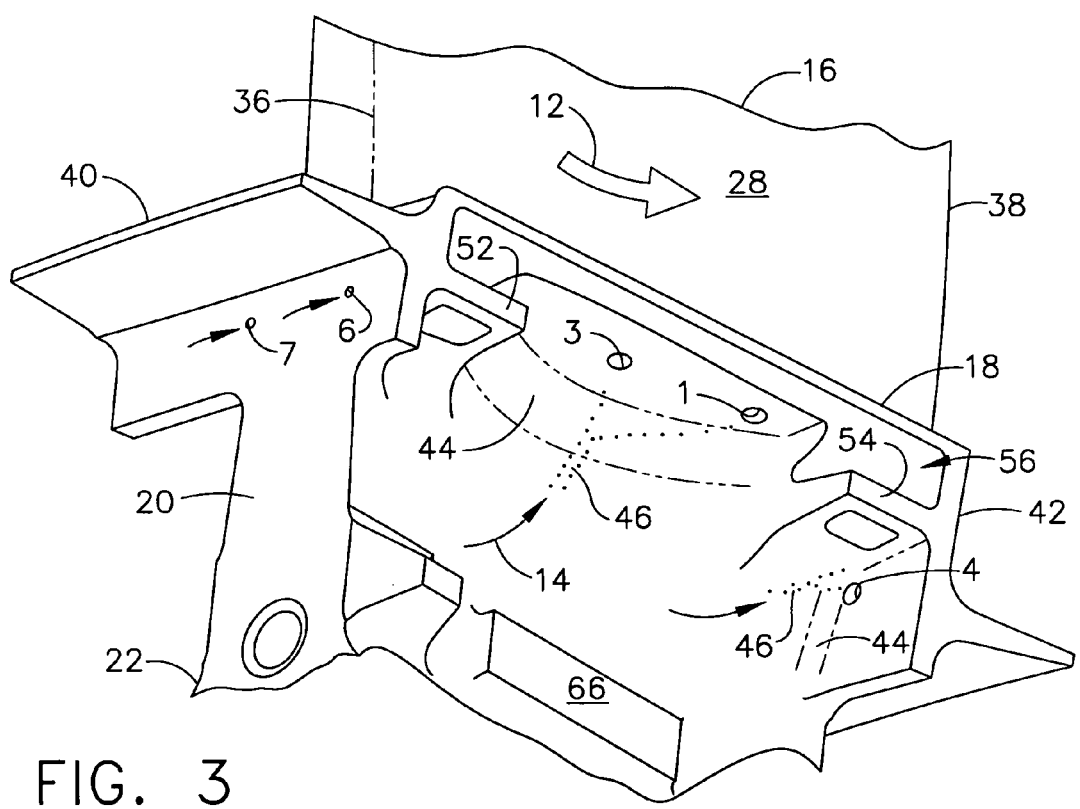
FIG. 3 is an isometric view of the forward, pressure side of the platform.

As indicated above in the Background section, the purge air 14 channeled under the platform may contain undesirable dust 46, shown schematically in FIGS. 2 and 3 in exaggerated scale. The dust 46 may have any material composition as listed above, and is typically in the form of fine, small particles entrained in the pressurized air received from the compressor during operation.

Experience has shown that the dust 46 can accumulate under the platform 18 particularly in the regions of the fillets 44 where they are bounded overhead by the platform that traps the dust thereat. Over time, the dust can accumulate in the fillets 44, and in other discontinuity or trapping regions of the platform and shank and lead to undesirable corrosion of the blade reducing its useful life.

Accordingly, a relatively large dust discharge or escape hole 1 may be preferentially located through the platform 18 to adjoin the platform fillet 44 and bleed the dust 46 therefrom and reduce or eliminate dust accumulation in the fillet. One or more of the escape holes may be preferentially located in stagnant regions at corresponding discontinuities in the smooth profile between the platform and shank to wash away dust accumulation therein.

As indicated above, since the dust 46 has mass, it is subject to the centrifugal forces effected during rotation of the blades during operation to drive the dust radially outwardly to the underside of the platform in stagnant regions thereof typically associated with the fillet transitions.

Furthermore, the combustion gases 12 flow over the pressure and suction sides of the airfoil with different distributions in gas pressure which is typically higher pressure near the leading edge with decreased pressure near the trailing edge. The pressurized purge air 14 channeled into the cavity under the platform has a relatively high pressure typically greater than the pressure of the combustion gases at the aft end of the airfoil, but may not be greater than the pressure of the combustion gases at the forward end of the airfoil.

Accordingly, the dust escape hole 1 is preferentially located to adjoin the platform fillet 44 in any region subject to dust accumulation, and with suitable driving pressure for washing away dust accumulation therein.

As shown in FIG. 3, the exemplary first escape hole 1 extends radially through the platform 18, with an inlet exposed under the platform suitably near the fillet 44. The first hole also has an opposite outlet exposed atop the platform and spaced laterally from the airfoil root 32 and spaced aft from the leading edge 36 as best illustrated in FIG. 2.

FIG. 2 illustrates that the airfoil root 32 joins the top of the platform at a relatively small fillet for maintaining the desired arcuate contours of the pressure and suction sides. FIG. 3 illustrates that the platform joins the top of the shank at a substantially larger fillet 44 which carries centrifugal loads through the shank to the dovetail with minimal stress concentration.

The exemplary airfoil 16 illustrated in FIG. 1 is hollow and includes an internal cooling circuit 48 which may have any conventional configuration, such as the six radial channels illustrated therein. The cooling circuit includes three inlets at the base of the dovetail 22 that receive the pressurized cooling air from the compressor. And, the airfoil includes exemplary rows of conventional film cooling holes 50 extending through the pressure side 28 in flow communication with the internal cooling circuit 48 for discharging the spent cooling air therefrom during operation.

The exemplary blade illustrated in FIG. 1 is configured as a second stage HPT blade and may have any conventional cooling configuration and pattern of film cooling holes 50.

Typical film cooling holes, such as the holes 50 illustrated in FIG. 1, are relatively small and have a diameter of about 13 mils (0.33 mm), and are typically inclined through a wall at a small inclination angle of about 15 degrees to discharge the cooling air therethrough in a film that extends downstream therefrom for generating a thermally insulating layer of air.

In contrast, the escape hole 1 is not provided for its cooling effectiveness, but instead is provided for carrying dust therethrough with reduced chance of plugging thereof. Accordingly, the escape hole is relatively large, and is larger in diameter by a significant amount than the typical film cooling hole such as the holes 50 in the airfoil.

For example, the escape hole 1 is preferably cylindrical between its inlet and outlet and has a diameter of about 30 mils (0.76 mm) which is two to three times the diameter of a typical film cooling hole. This large diameter will ensure passage of the dust particles without undesirable plugging, and the escape hole may have any suitable orientation or inclination through the platform for its dust carrying capability.

The airfoil 16 illustrated in FIG. 1 has a conventional profile that increases in width or thickness aft from the leading edge 36 to a maximum thickness A spaced aft therefrom about a third of the chord length, and decreases in thickness to the trailing edge 38. The exemplary first escape hole 1 is spaced aft of the maximum thickness of the airfoil in a region to ensure that the pressure of the purge air 14 below the platform is greater than the pressure of the combustion gases 12 outside the platform to ensure discharge of the air and dust from beneath the platform, without ingestion of the combustion gases therethrough.

Figure 4:
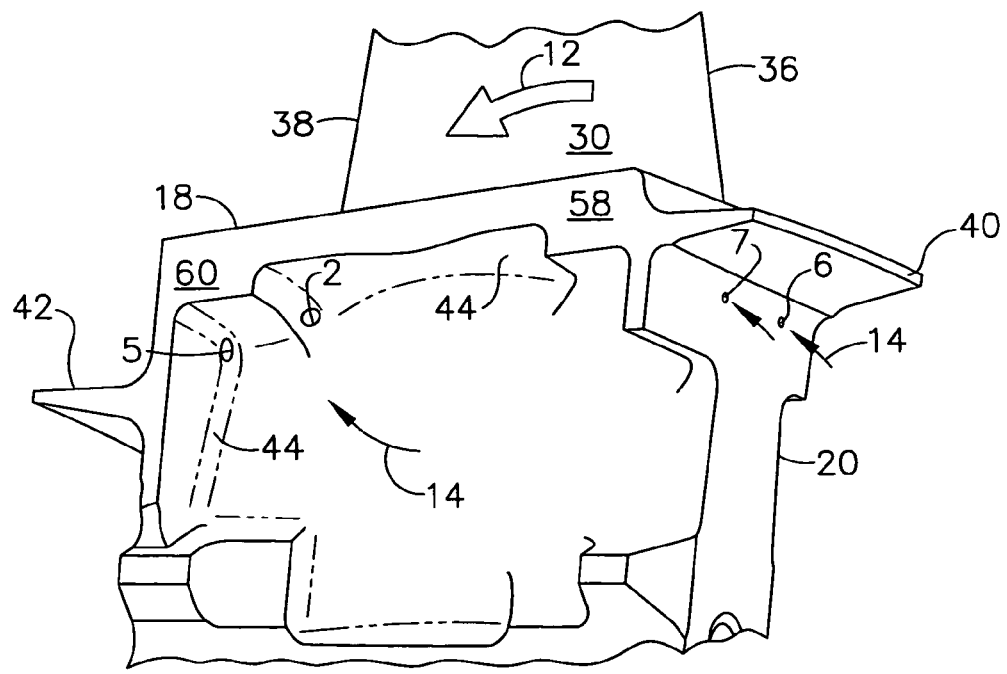
FIG. 4 is an isometric view of the forward, suction side of the platform.

As illustrated in FIGS. 2-4, the platform 18 includes the first dust hole 1 corresponding with the pressure side 28 of the airfoil closely adjacent to the aft seal 42, and a second dust escape hole 2 corresponding with the opposite suction side 30 of the airfoil, also closely adjacent to the aft seal 42. The two escape holes 1,2 may be identical in diameter and are both relatively large for discharging dust from beneath the platform. And, both escape holes 1,2 are located closely adjacent to or directly in the corresponding platform fillets 44 bridging the platform and shank.

As shown in FIGS. 2 and 3, the platform 18 further includes a third dust escape hole 3 disposed at about the midchord on the pressure side 28 of the airfoil spaced laterally between the root 32 and the splitline edge of the platform. The third escape hole 3 is also disposed closely adjacent to the platform fillet 44 for bleeding or removing dust accumulation in this region.

The platform 18 may be otherwise imperforate over its entire surface except for the three escape holes 1,2,3 which may all have the same relatively large diameter for discharging dust without plugging thereof during operation. And, the three escape holes are located aft of the midchord of the airfoil where the pressure of the combustion gases is lower than the pressure thereof forward of the midchord.

As shown in FIGS. 3 and 4, the platform 18 also joins the inner surface of the aft seal 42 at a corresponding fillet 44 extending radially along the shank. The aft seal 42 as illustrated in FIGS. 2-4 may include two more of the dust escape holes 4,5 corresponding with the opposite pressure and suction sides 28,30 of the airfoil.

The fourth escape hole 4 illustrated in FIG. 3 has an inlet in the fillet 44, and an outlet in the aft face of the seal. The fifth escape hole 5 as shown in FIG. 4 has an inlet in the fillet 44 and an outlet on the aft face of the aft seal 42. The outlets of the two escape holes 4,5 illustrated in FIG. 2 are in a relatively low pressure region of the turbine blade aft of the trailing edge 38 thereof for ensuring effective discharge of the dust 46 therethrough.

Like the aft seal illustrated in FIGS. 2-5, the forward seal 40 also joins the platform 18 at corresponding fillets 44 extending radially along the shank 20. The forward seal 40 may also include two more dust holes 6,7 which are specifically configured, not as escape holes but as inlet supply or sweep holes for channeling portions of the pressurized cooling air 14 through the holes 6,7 for sweeping clean the corresponding fillets 44 of dust accumulation, while also providing additional driving force to sweep the dust through the five escape holes 1-5.

Figure 5:
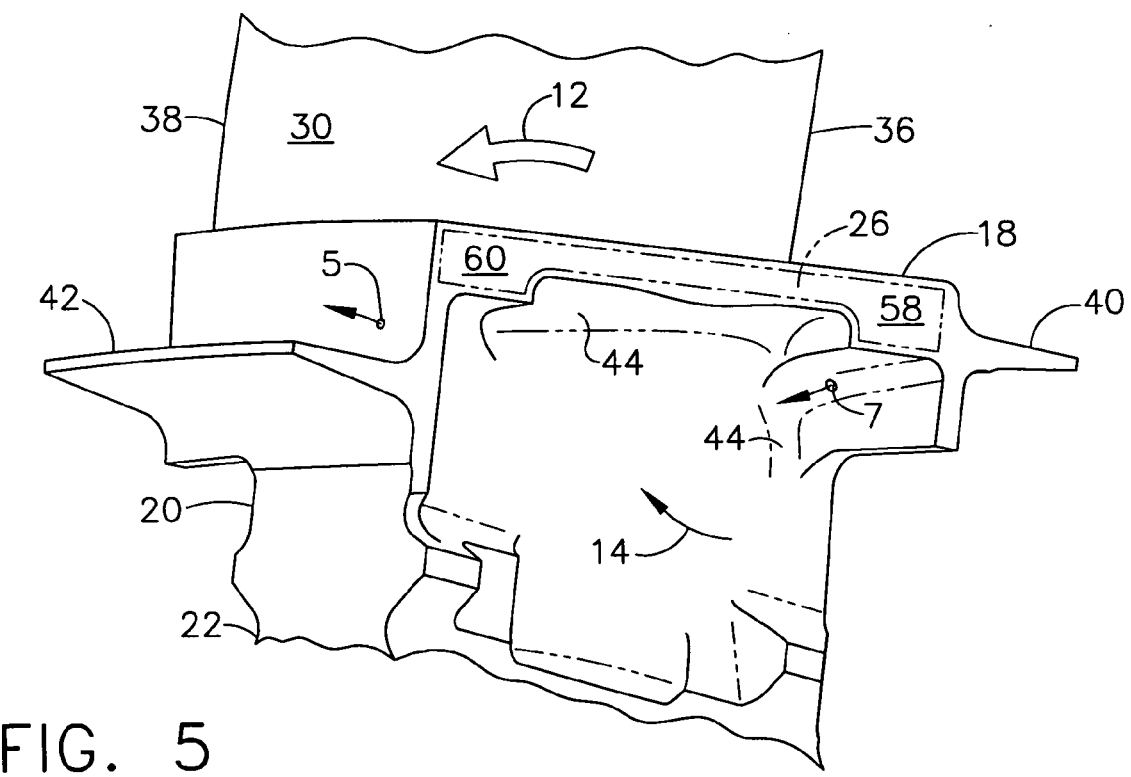
FIG. 5 is an isometric view of the aft, suction side of the platform.

The sixth dust hole 6 shown in FIGS. 2 and 3 corresponds with the pressure side 28 of the airfoil and has an inlet on the front face of the forward seal, and an outlet in the opposite fillet 44 under the platform. The seventh dust hole 7 corresponds with the suction side 30 of the airfoil as illustrated in FIGS. 4 and 5, and has an inlet on the front face of the forward seal and an outlet in the fillet 44 under the platform.

The two inlet dust holes 6,7 preferably have the same large diameter as the five escape holes 1-5 to supply sufficient sweep air under the platform for both sweeping clean the fillets in which they are disposed, as well as promoting sweeping action of the dust from the fillets adjoining the five escape holes 1-5.

The complexity of the junction between the shank 20 and platform 18 and associated seals 40,42 is further increased by the introduction of the damper 26 illustrated installed in FIG. 1.

FIGS. 2 and 3 illustrate the pressure side of the airfoil and platform along the axial splitline on which the shank 20 includes a pair of forward and aft ledges 52,54 that are integrally joined to respective ones of the forward and aft seals 40,42 and spaced apart from each other in the chord direction, as well as spaced radially inwardly below the platform 18 to define a shelf pocket 56.

The pocket 56 is specifically configured to loosely capture the axially elongate damper 26 as illustrated in FIG. 1. Each of the two ledges 52,54 is conventional in configuration and includes a rectangular hole therethrough through which corresponding legs of the damper 26 are trapped for loosely trapping the damper in the pocket.

The two ledges 52,54 illustrated in FIGS. 2 and 3 are similarly joined to the shank and seals with additional ones of the large fillets 44 for providing smooth transitions there between.

As shown in FIG. 3, the fourth escape hole 4 is preferably disposed in the fillet below the aft ledge 54 in the three-sided corner defined thereby. In this way, the radially outward migration of the dust 46 at this location is conveniently washed from this fillet below the aft ledge for discharge through the fourth escape hole 4.

Correspondingly, the sixth dust hole 6 illustrated in FIG. 2 extends axially through the forward seal 40 to the fillet at the aft end of the forward ledge 52 at the damper retaining pocket 56. In this way, the inlet supply air washes dust from this fillet region under the platform and feeds the corresponding dust escape holes.

The forward and aft ledges 52,54 as illustrated in FIGS. 2 and 3 are preferably disposed on the pressure side 28 of the airfoil. Correspondingly, on the suction side 30 of the airfoil as illustrated in FIGS. 4 and 5, the platform 18 includes a splitline face having a pair of forward and aft face corners 58,60 specifically sized to engage the damper 26, illustrated in phantom in FIG. 5, of the next adjacent blade for effecting frictional contact therewith, and thereby frictional damping during operation. As indicated above, the damper 26 and its supporting configuration may have any conventional configuration.

In FIGS. 4 and 5, the fifth escape hole 5 is introduced in the fillet below the aft face corner 60 for washing away dust accumulation therefrom. Correspondingly, the seventh inlet dust hole 7 illustrated in FIG. 5 is located in the fillet below the forward face corner 58 for washing away dust accumulation therein. In FIG. 5, the dust hole 7 provides inlet air under the platform, whereas as in FIG. 4, the dust hole 5 provides an outlet for the pressurized air and dust.

The turbine rotor blade illustrated in FIGS. 1-5 may be otherwise conventional in configuration except for the introduction of the seven dust holes 1-7 and cooperating fillets. The dust holes may be preferentially introduced in the corresponding fillets under the platform in regions of previously observed dust accumulation for preventing or reducing dust accumulation in the improved blade. The complex configuration of the platform includes various overhangs or ledges which block the radially outward travel of the cooling air and dust and introduce stagnation regions in which the dust may accumulate, but for the introduction of the specifically located dust holes 1-7.

As indicated above, the dust holes themselves may be relatively simple, with cylindrical configurations and relatively large diameters of about 0.76 mm. And, the number of dust holes is limited to avoid otherwise degrading aerodynamic performance of the turbine blade with the complex pressure distributions across the pressure and suction sides thereof and between the leading and trailing edges.

The platform may be otherwise imperforate except for the minimum number of dust escape holes that may include the first or second escape holes 1,2 on either side of the airfoil or on both sides, and with the addition of the third escape hole 3 in the larger surface area of the pressure side platform as opposed to the suction side platform.

The cylindrical dust holes illustrated in FIGS. 2-5 have plain circular or oval inlets and outlets on the respective surfaces in which they are found. The apertures of the dust holes are preferably located directly within the corresponding fillets 44, or as close thereto as possible for effectively sweeping dust accumulation therefrom.

Figure 6:
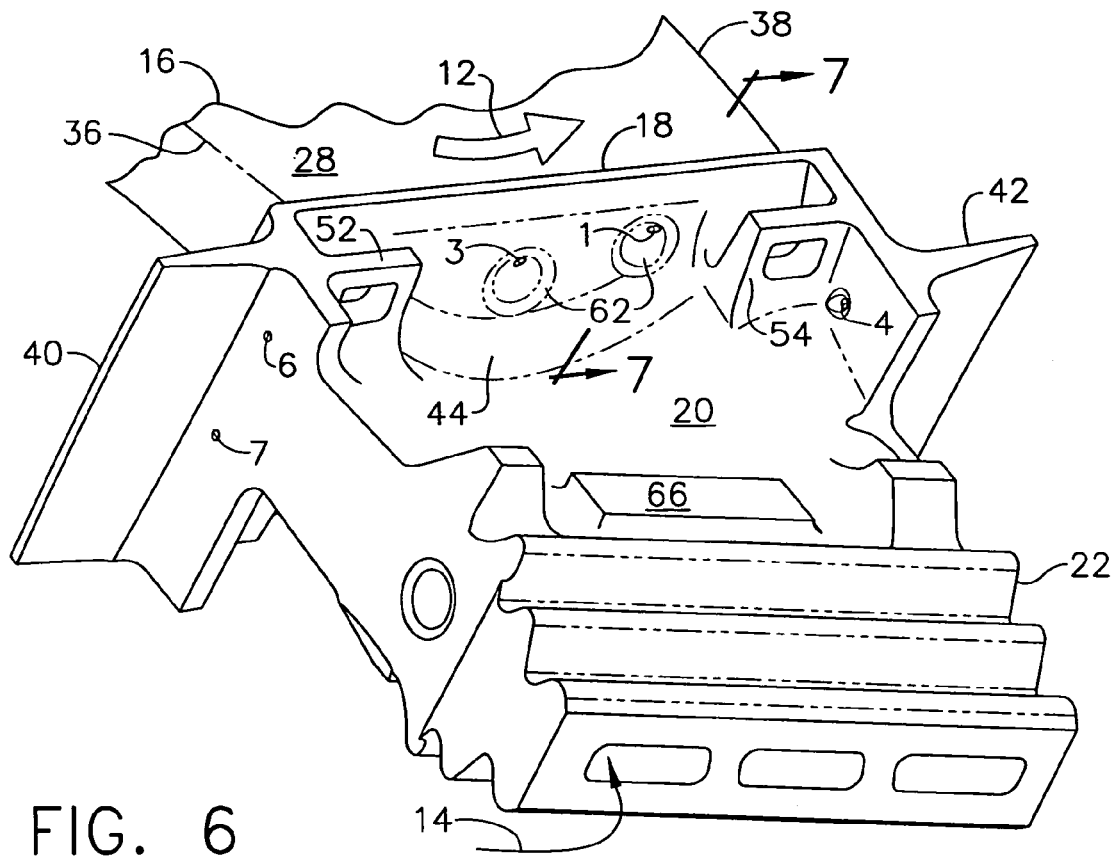
FIG. 6 is an isometric view of the pressure side of the platform in accordance with another embodiment.
Figure 7:
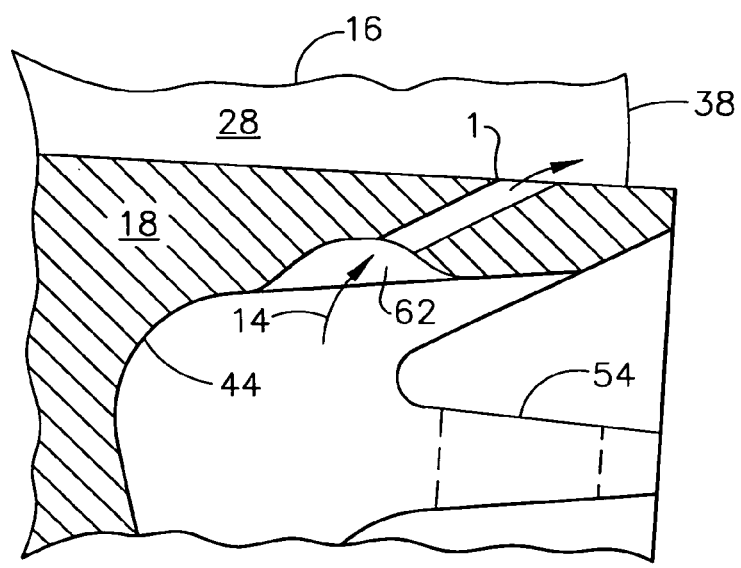
FIG. 7 is an radial sectional view through a dust escape hole in the pressure side of the platform as illustrated in FIG. 6 and taken along line 7-7.
Figure 8:
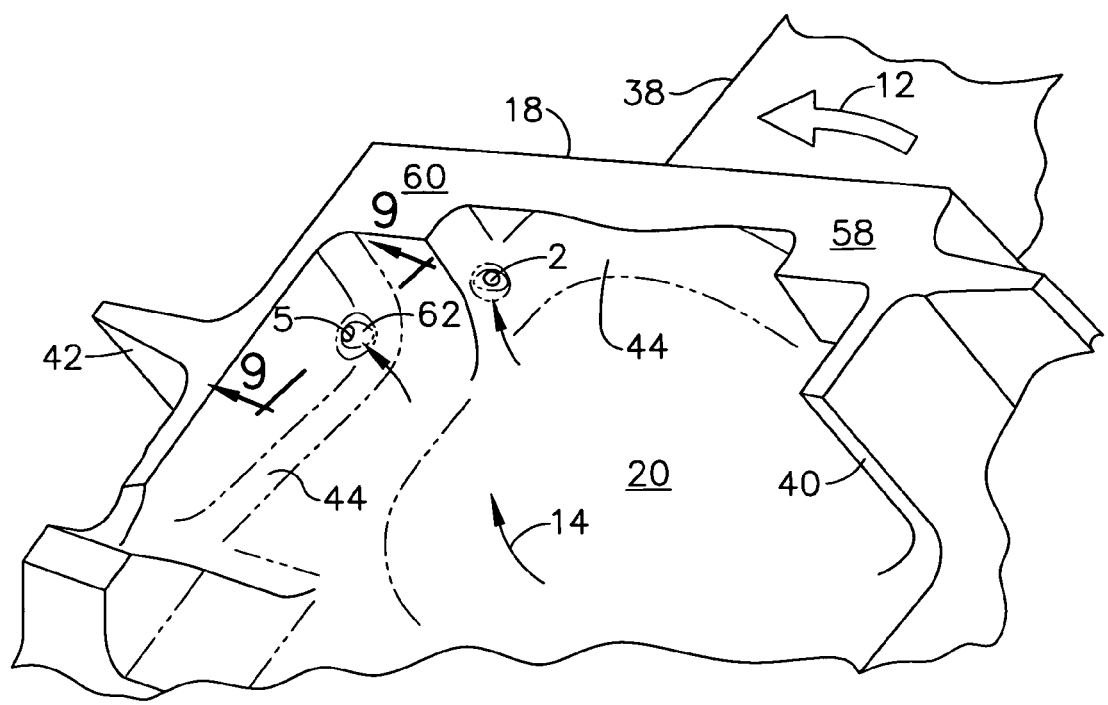
FIG. 8 is an isometric view of the suction side of the platform illustrated in FIG. 6.
Figure 9:
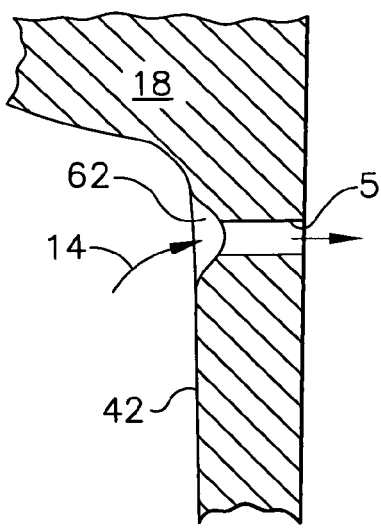
FIG. 9 is a radial sectional view through one of the dust escape holes illustrated in FIG. 8 and taken along line 9-9.

FIGS. 6-9 illustrate another embodiment of the escape holes themselves. FIG. 6 corresponds with FIG. 3 with the three escape holes 1,3,4 shown therein; and FIG. 8 corresponds with FIG. 4 and the two escape holes 2,5 illustrated therein.

In these figures, the platform 18 and its integral seals 40,42 include corresponding inlet dimples 62 adjoining the respective fillets 44. Each dimple 62 is aligned with a respective one of the escape holes that extend therefrom and through the remainder of the platform 18.

Each dimple 62 is preferably spherical in contour and provides an axisymmetric concave inlet for the respective escape hole which may continue to be cylindrical outwardly therefrom.

The corresponding dimple 62 may be associated with any one or more of the five escape holes 1-5, and provides a local funnel for collecting and capturing dust in the vicinity thereof for better promoting the sweeping of dust from the corresponding fillet regions of the platform. Since the underside of the platform is exposed to view, the complex spherical dimple 62 may be readily manufactured using a correspondingly shaped electrical discharge machining (EDM) electrode for example. Alternatively, the dimples may be initially cast in the original blade, with the escape holes 1-5 being later drilled therethrough by conventional laser drilling.

Figure 10:
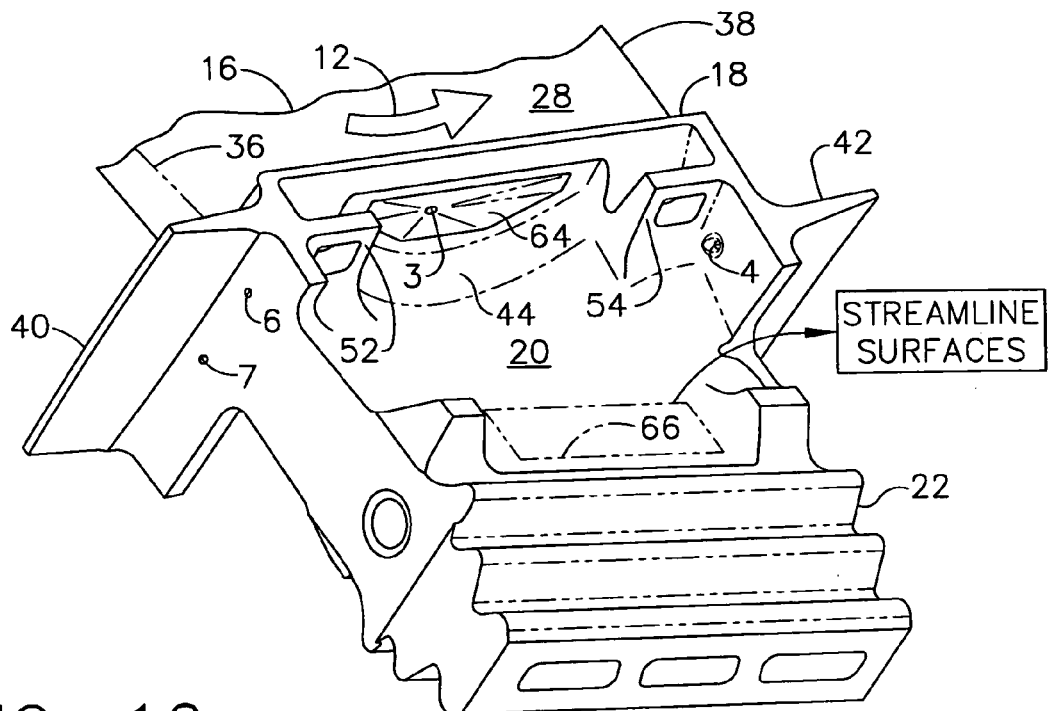
FIG. 10 is an isometric view of the forward, pressure side of the platform in accordance with another embodiment.
Figure 11:
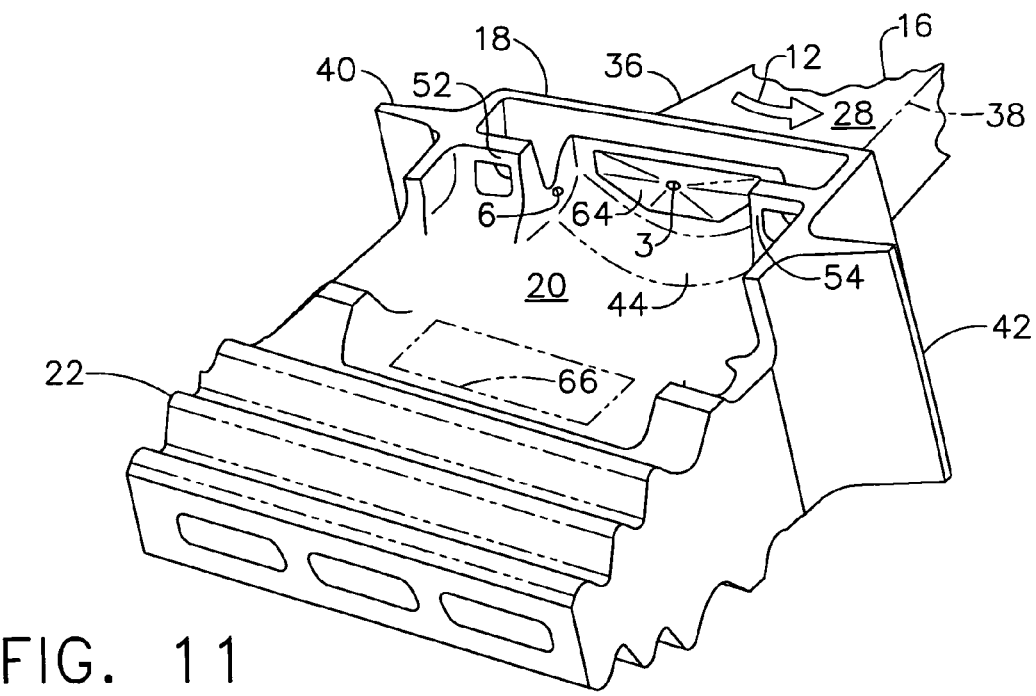
FIG. 11 is an isometric view of the platform aft, pressure side illustrated in FIG. 10.

FIGS. 10 and 11 illustrate another embodiment of the dimple associated with the third escape hole 3 located in the midchord region of the airfoil on the concave pressure side 28. The pressure side of the platform conforms with the concave pressure side of the airfoil and the corresponding concave pressure side of the shank 20, and has a locally large surface area greater than the suction side of the platform which meets the convex suction side of the airfoil.

Accordingly, one large and elongate recess or trough 64 may be formed in the inner surface of the pressure side of the platform and extends chordally along a substantial portion of the adjoining fillet 44. A single escape hole, hole 3, may be centered in the trough, and thereby eliminates all other escape holes in this region including the first escape hole 1 shown in corresponding FIG. 6.

The size or area of the trough 64 may be maximized within the available space of the pressure side platform and is preferably arcuate along the platform fillet 44 to conform with the concave profile of the shank and airfoil in this region. The trough is also substantially straight outboard therefrom along the straight edge or splitline face of the platform. In this way, the trough conforms with the available surface area of the pressure side of the platform 18 along the airfoil 16.

The trough, like the dimple in the above embodiment, forms a funnel that increases in depth to the escape hole 3 at its center for collecting and sweeping dust from the underside of the platform for discharge out the escape hole. The remainder of the platform and angel wing seals may be identically configured with the corresponding escape holes and inlet sweep holes described above.

FIGS. 3 and 4 illustrate in general the complexity of integrally joining the rectangular platform 18 to the arcuate airfoil 16 and shank 20, with the corresponding forward and aft angel seal wings 40,42. Further adding to the complexity is the introduction of the forward and aft ledges 52,54 defining the pocket 56 for mounting the damper 26 as shown in FIG. 1. And, the forward and aft face corners 58,60 provide a planar surface against which the damper may frictionally engage during operation for effective damping of vibratory excitation forces.

Since conventional turbine blade platforms lack any specific configuration to avoid dust accumulation, they are designed with various fillets and overhangs and stagnant corners in which dust may accumulate during operation. Accordingly, the various dust holes described above may be preferentially introduced in or near corresponding fillets prone to dust accumulation for reducing or eliminating dust accumulation therein. And, the various fillets subject to dust accumulation may be suitably modified for increasing their curvature to streamline the dust removal paths.

For example, the various fillets 44 disclosed above which are subject to dust accumulation in the parent conventional turbine blade, may be suitably modified with larger radius of curvature for the fillets for streamlining the dust sweeping flowpath, along with radially outward sloping or inclination to guide the dust to the local escape holes.

FIG. 3 illustrates the typical elevated plateau or flat boss 66 at the bottom of the shank on the pressure side of the blade which is typically provided for inscribing a serial number. That boss 66 may be eliminated as illustrated in FIG. 10 to streamline the surface of the shank 20 and not only eliminate additional dust accumulation sites, but promote the smooth flowpath for the dust to the various escape holes.

FIGS. 4 and 5 illustrate the typical configuration of the two face corners 58,60 for engaging the damper, which are generally rectangular or triangular blocks of metal with flat underside surfaces.

Figure 12:
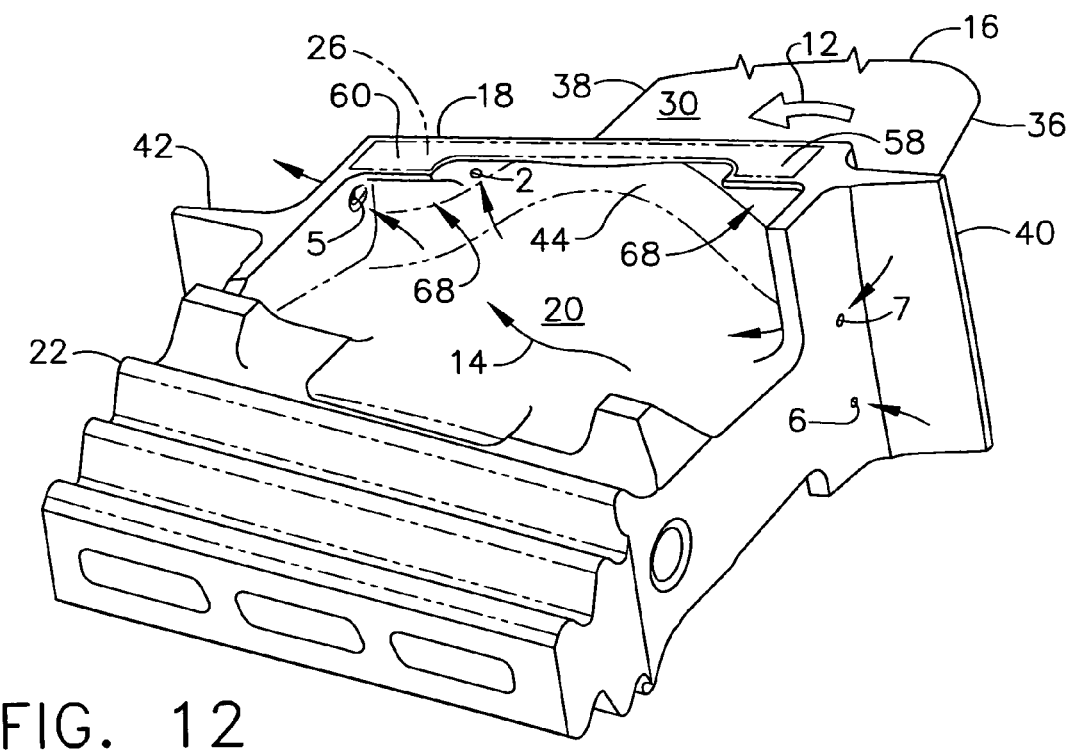
FIG. 12 is an isometric view of the forward, suction side of the platform, like FIG. 4, in another embodiment.
Figure 13:
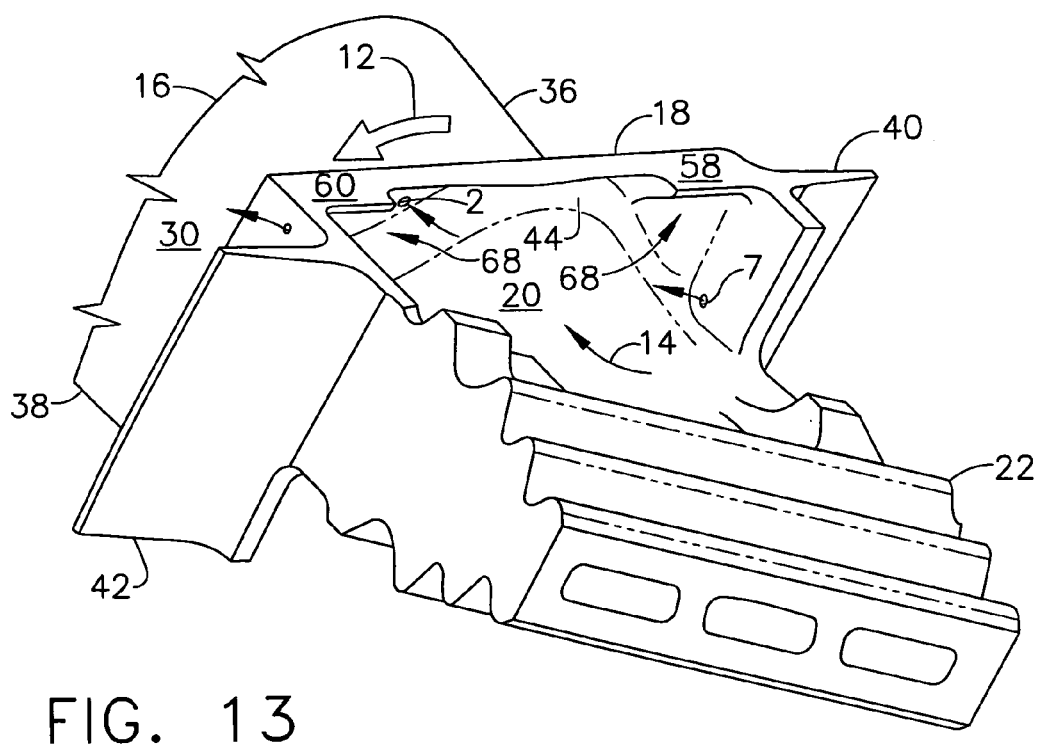
FIG. 13 is an isometric view of the aft, suction side of the platform illustrated in FIG. 12, like FIG. 5, in another embodiment.

FIGS. 12 and 13 correspond with these two figures and show yet another embodiment for streamlining the platform and eliminating some dust accumulation sites. Both the forward and aft face corners 58,60 maintain their coplanar and flat outboard surfaces for engaging the damper, but are both recessed or undercut on their inboard sides in common large fillets or undercuts 68 that extend radially outwardly along the span of the blade under the platform. The respective undercuts 68 at both corners join the large axial fillet 44 which blends the underside of the platform to the top of the shank 20.

As shown in FIG. 12, the fifth escape hole 5 is located in the undercut 68 behind the aft corner 60 and is fed by the undercut and fillet 44 for smoothly removing dust accumulation in this region. The second escape hole 2 is also located near this undercut 68 in the adjoining fillet 44 and provides another escape route for the dust behind the aft corner 60.

Correspondingly, the seventh dust hole 7 illustrated in FIG. 13 provides an inlet for the sweeping air which directly feeds the undercut 68 behind the forward corner 58 for bleeding dust accumulation in this region.

The common undercuts 68 behind the forward and aft corners 58,60 provide a streamlined transition with the platform fillet 44 and promote the sweeping and elimination of dust from the suction side of the platform.

The various dust holes and cooperating fillets disclosed above may be used singly or in various combinations where space permits for dust proofing the platform of the turbine rotor blade. The dust resistant platform will therefore reduce or eliminate dust accumulation therein when the aircraft is flown along routes having dust contaminated air. In routes in which the air is relatively clean with minimal dust, the streamlined platform and shank surfaces promote the efficient purging of air below the platforms, and do not adversely affect the intended aerodynamic performance of the turbine blades and the complex pressure distributions along the pressure and suction sides thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine rotor blade comprising a hollow airfoil, platform, shank, and dovetail integrally joined together, with a dust escape hole extending through said platform adjacent a fillet bridging said platform and shank and being larger in diameter than a film cooling hole extending through said airfoil.

2. A blade according to claim 1 wherein said escape hole extends through said platform with an inlet under said platform near said fillet and an outlet atop said platform spaced laterally from a root and aft from a leading edge of said airfoil.

3. A blade according to claim 2 wherein:
said platform extends laterally from opposite pressure and suction sides of said airfoil, and is integrally joined at corresponding fillets to forward and aft seals at opposite ends of said shank; and
said aft seal includes a dust escape hole in said fillet thereat.

4. A blade according to claim 3 wherein said platform includes a dimple adjoining said fillet, and said escape hole extends from said dimple through said platform.

5. A blade according to claim 4 wherein said platform includes two dust escape holes corresponding with said opposite pressure and suction sides of said airfoil adjacent said aft seal.

6. A blade according to claim 5 wherein said aft seal includes two dust escape holes corresponding with said opposite pressure and suction sides of said airfoil.

7. A blade according to claim 6 wherein:
said platform joins said forward and aft seals at corresponding fillets; and
said forward seal includes an inlet sweep hole extending therethrough to said fillet thereat for channeling pressurized air to said escape holes.

8. A blade according to claim 7 wherein said forward seal includes two inlet sweep holes corresponding with said opposite pressure and suction sides of said airfoil.

9. A blade according to claim 8 wherein:
said shank includes a pair of forward and aft ledges joined to respective ones of said forward and aft seals and spaced apart from each other and inwardly below said platform to define a pocket;
said pocket includes a damper captured therein; and
said aft ledge includes a dust escape hole therebelow.

10. A blade according to claim 9 wherein:
said forward and aft ledges are disposed on said pressure side of said shank;
said platform further includes a splitline face on said suction side having a pair of forward and aft face corners sized to engage said damper of a next adjacent blade for frictional contact therewith;
said corners are undercut and extend outwardly to said platform in a common undercut therewith; and
said dust escape hole extends through said common undercut.

11. A turbine rotor blade comprising:
a hollow airfoil joined in turn to a platform, shank, and supporting dovetail;
said airfoil including opposite pressure and suction sides extending longitudinally in span from a root at said platform to an opposite tip, and axially in chord between opposite leading and trailing edges, and further including a film cooling hole therein;
said platform extending laterally from both said pressure and suction sides, and integrally joined to a forward seal at said leading edge and to an aft seal at said trailing edge; and
said platform joins said shank at a fillet, and includes a dust escape hole being larger in diameter than said film cooling hole and adjoining said fillet to bleed dust therefrom.

12. A blade according to claim 11 wherein said escape hole extends through said platform with an inlet under said platform near said fillet and an outlet atop said platform spaced laterally from said root and aft from said leading edge.

13. A blade according to claim 12 wherein said airfoil increases in thickness aft from said leading edge to a maximum thickness, and then decreases in thickness to said trailing edge, and said escape hole is spaced aft of said maximum thickness.

14. A blade according to claim 12 wherein said escape hole is cylindrical.

15. A blade according to claim 12 wherein said platform includes a dimple adjoining said fillet, and said escape hole extends from said dimple through said platform.

16. A blade according to claim 15 wherein said dimple is spherical.

17. A blade according to claim 12 wherein said platform includes an elongate trough extending chordally along said fillet, and said escape hole is centered therein.

18. A blade according to claim 17 wherein said trough is arcuate along said fillet and straight outboard therefrom to conform with the surface area of said platform along said airfoil to funnel dust out of said escape hole.

19. A blade according to claim 12 wherein:
said platform joins said forward and aft seals at corresponding fillets; and
said aft seal includes a dust escape hole in said fillet thereat.

20. A blade according to claim 19 wherein said aft seal includes two dust escape holes corresponding with said opposite pressure and suction sides of said airfoil.

21. A blade according to claim 12 wherein:
said platform joins said forward and aft seals at corresponding fillets; and
said forward seal includes an inlet sweep hole extending therethrough to said fillet thereat for channeling pressurized air to said escape hole.

22. A blade according to claim 21 wherein said forward seal includes two inlet sweep holes corresponding with said opposite pressure and suction sides of said airfoil.

23. A blade according to claim 12 wherein said platform includes two dust escape holes corresponding with said opposite pressure and suction sides of said airfoil adjacent said aft seal.

24. A blade according to claim 23 wherein said platform further includes a third dust escape hole disposed about midchord on said pressure side.

25. A blade according to claim 12 wherein:
said shank includes a pair of forward and aft ledges joined to respective ones of said forward and aft seals and spaced apart from each other and inwardly below said platform to define a pocket;
said pocket includes a damper captured therein; and
said aft ledge includes a dust escape hole therebelow.

26. A blade according to claim 25 wherein said forward seal includes an inlet sweep hole extending therethrough to said forward ledge at said pocket.

27. A blade according to claim 25 wherein:
said forward and aft ledges are disposed on said pressure side of said shank;
said platform further includes a splitline face on said suction side having a pair of forward and aft face corners sized to engage said damper of a next adjacent blade for frictional contact therewith;
said corners are undercut and extend outwardly to said platform in a common undercut therewith; and
said dust escape hole extends through said common undercut.

28. A turbine rotor blade comprising an airfoil, platform, shank, and dovetail integrally joined together, with said platform being imperforate except for no more than three dust escape holes extending therethrough adjacent a fillet bridging said platform and shank.

29. A blade according to claim 28 wherein:
said shank is imperforate below said fillet and between forward and aft seals at opposite ends thereof;
said forward seal includes an inlet sweep hole extending therethrough; and
said aft seal includes a dust escape hole extending therethrough.

* * * * *